Figure 1:
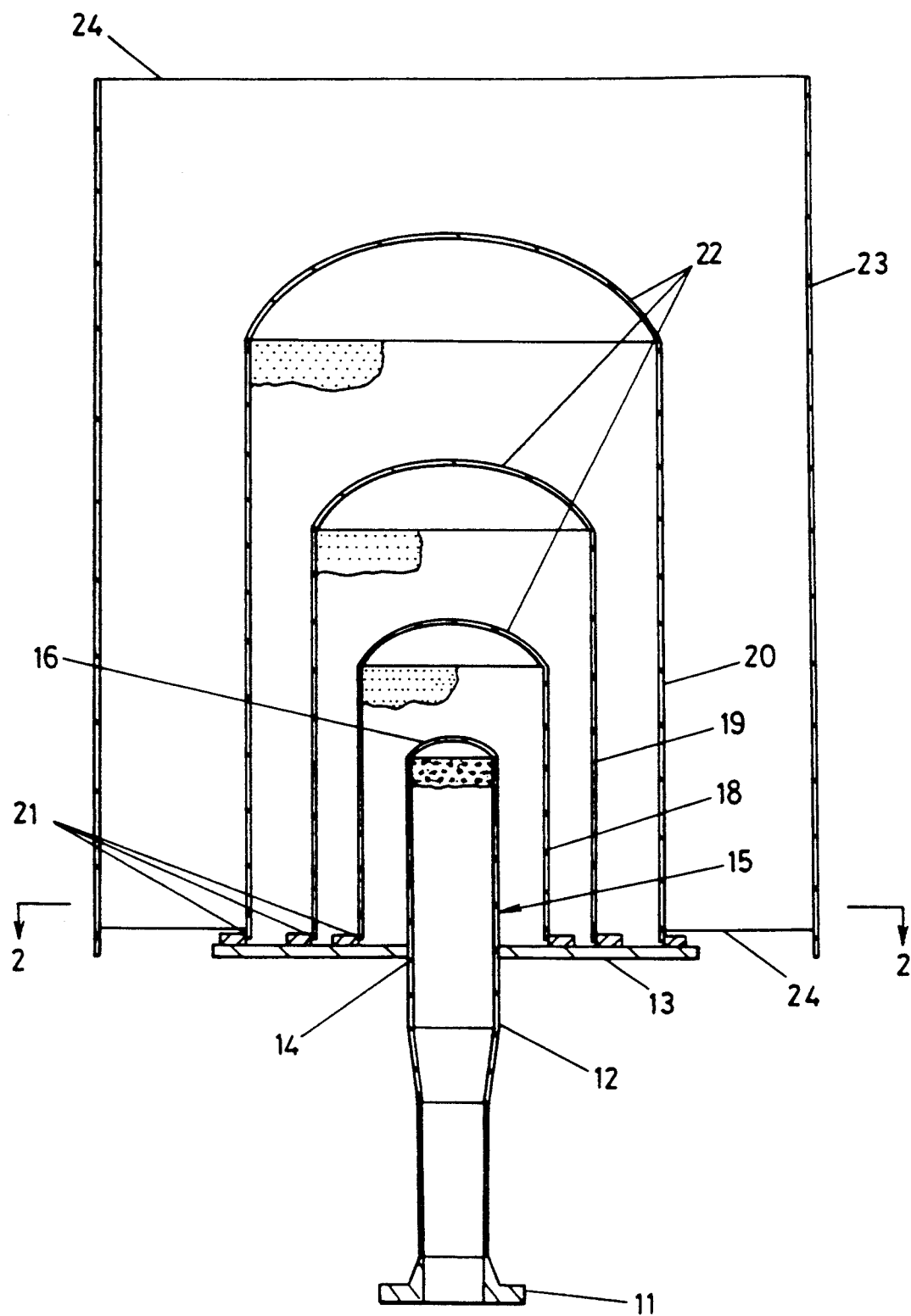

United States Patent
Swift

Patent Number: 5,266,754
Date of Patent: Nov. 30, 1993

[54] GAS BLOW-OFF ATTENUATOR

[76] Inventor: Peter B. Swift, 3 Ashbourne Avenue, Kingswood, South Australia, Australia

[21] Appl. No.: 381,058

[22] Filed: Jul. 17, 1989

[51] Int. Cl.$^5$ .............. F01N 3/06; F01N 1/08
[52] U.S. Cl. ............................... 181/230; 181/272; 181/275
[58] Field of Search .............. 181/224, 272, 230, 238, 181/268, 275; 138/26, 30

[56] References Cited

U.S. PATENT DOCUMENTS

| | | | |
|---|---|---|---|
| 1,042,347 | 10/1912 | Herriot | 181/272 |
| 1,067,200 | 7/1913 | Shlosberg | 181/272 |
| 2,940,538 | 6/1960 | Billey | 181/247 |
| 4,113,050 | 9/1978 | Smith | 181/230 |
| 4,375,841 | 3/1983 | Vielbig | 181/272 |

*Primary Examiner*—Michael L. Gellner
*Assistant Examiner*—Eddie C. Lee
*Attorney, Agent, or Firm*—Darby & Darby

[57] ABSTRACT

A gas blow-off noise attenuator comprising two or more perforate diffusion members through which gas is arranged to pass in succession wherein the total free area of perforation in each member increases in successive stages to ensure that sonic fluid velocity occurs through one of the stages and at any mass flow within a predetermined range from a low value up to the maximum mass flow through the unit, and wherein the pressure ratio across the final diffusion member is near but above the minimum necessary to cause sonic fluid velocity through its perforations.

12 Claims, 3 Drawing Sheets

GAS BLOW-OFF ATTENUATOR

This invention relates to an improved sound attenuator or silencer for use in blow-off systems for gases and vapours, and is especially directed to a sound attenuator for use in gas pipeline compressor and metering stations, in-line blow-off points, boiler relief valves and compressed air control and actuating systems.

Particularly where blow-offs occur without warning, there is a high risk of severe hearing damage to people nearby. Typical unattenuated levels at one meter distance are in the range of 140 to 150 dBA (decibels on the "A" scale), sufficient to cause permanent hearing damage to many individuals. It is necessary to reduce this to around 115 dBA to ensure the safety of on-site personnel. It is generally considered that the performance of conventional attenuators is inadequate, or alternatively their size, complexity and cost are excessive.

Conventional attenuator designs using dissipative (absorptive) elements suffer from the following problems:

(i) their size is too large to support economically, and to fit in the available space;
(ii) cost of manufacture is comparatively high due to size and complexity;
(iii) the deterioration of the absorptive material; and
(iv) it is difficult to achieve a high attenuation level within practical design limitations.

Known non-absorptive attenuators have other problems:

(i) attenuation varies with fluid flow; and
(ii) total attenuation is not high from a practical viewpoint.

The main object of this invention is to provide an improved sound attenuator of simple design, of low cost and which will reduce blow-off noise to safe levels such that significant hearing damage will not result from short term exposure, at the same time without reducing the mass flow of the fluid through the blow-off system.

The attenuator of the present invention is designed so that flow noise, produced upstream of the final discharge jet flowing at sonic velocity, is prevented from escaping to atmosphere. The noise level of a sonic velocity discharge also depends on the pressure ratio across it. The lower this pressure ratio is, the lower will be the noise level.

The attenuator design of this invention has therefore been developed to ensure that the pressure ratio of the final discharge jet is kept at a minimum for the range of gas flows encountered.

More specifically, according to this invention, a noise attenuator for use in blow-off vents in air, gas or vapour systems, comprises an inlet opening for attachment to a fluid line to be vented, two or more spaced apart at least partly perforate diffusion members through which the gas is arranged to pass in succession, and a discharge outlet which may be vented to atmosphere or to a further noise attenuator of the absorptive, reactive or other type, characterised in that the total free area of perforation in each member increases in successive stages to ensure that sonic fluid velocity occurs through one of the stages and at any mass flow within a predetermined range from a low value up to the maximum mass flow through the unit, and further characterised in that the pressure ratio across the outermost or final perforate member through which sonic fluid velocity occurs is near but above the minimum necessary to cause sonic fluid velocity through the perforations of that member.

Desirably, the number of stages is selected to provide a discharge pressure ratio across one or more of the perforate members within prescribed limits over the designed flow range and at the pressure of the fluid system at the entry to the attenuator.

Desirably, the diameter of the holes in the perforate members is such as to cause an upward frequency shift in the noise generated by fluid flow within the attenuator which is in contradistinction with the frequencies of the noise generated by an unattenuated open pipe discharge.

In a preferred embodiment, each of the perforate members is formed as a cylindrical element made from sheet metal or synthetic plastics sheet material, the cylindrical elements being co-axially aligned and housed one inside the other, with the height of the cylinder members progressively increasing in the direction of gas flow.

With this invention, the noise levels in the general area, for example 10 meters away, have been reduced by up to approximately 28 dBA. Greater noise reductions are evident closer to the attenuator location.

The attenuator unit of this invention is able to be supported by existing pipework, thereby minimising installation costs. Further there is no porous material in the units to retain moisture or deteriorate. The cost of the attenuator of this invention is in general much less than the cost of extending the blow-off pipe to a more remote location outside the installation (this being an unacceptable solution in any case).

With this invention, the attenuator design can be computer programmed in order to size the stage diffusers to provide the correct sequence of operation over the required flow range, and still permit the full design flow for the particular valve used.

Figure 2:
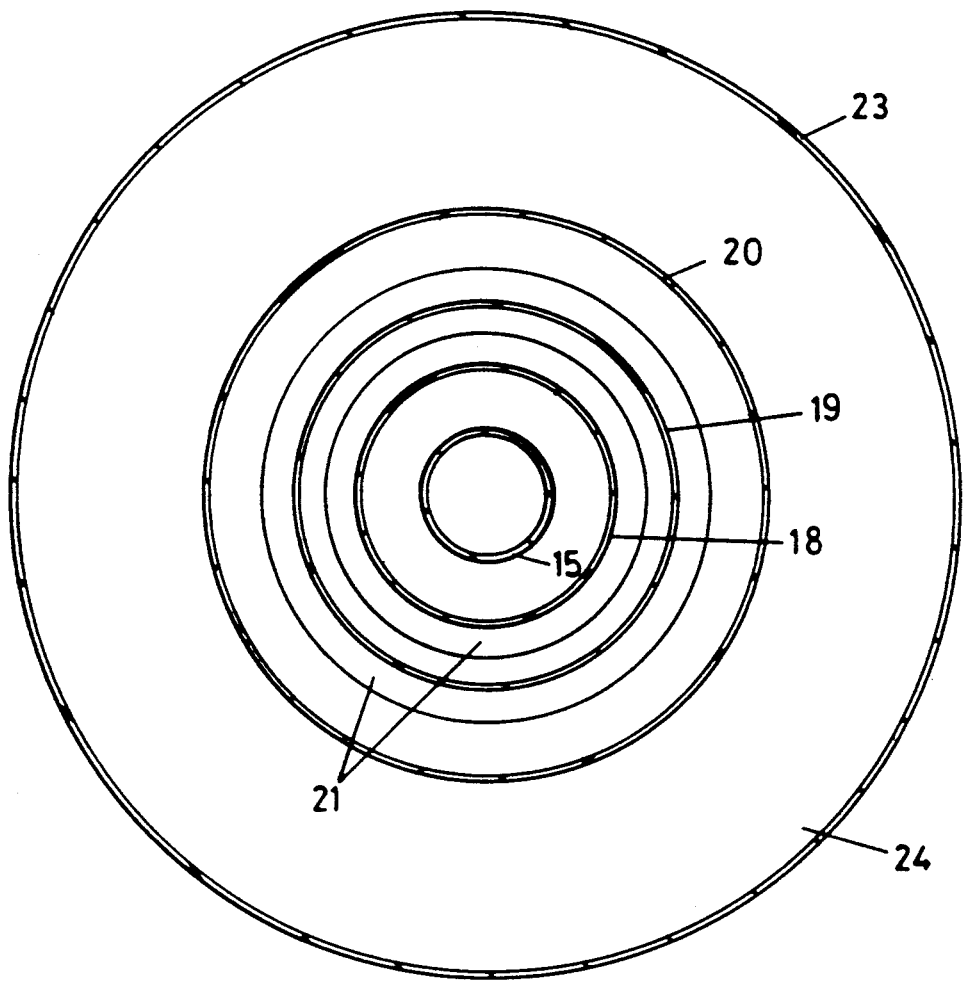
Figure 3:
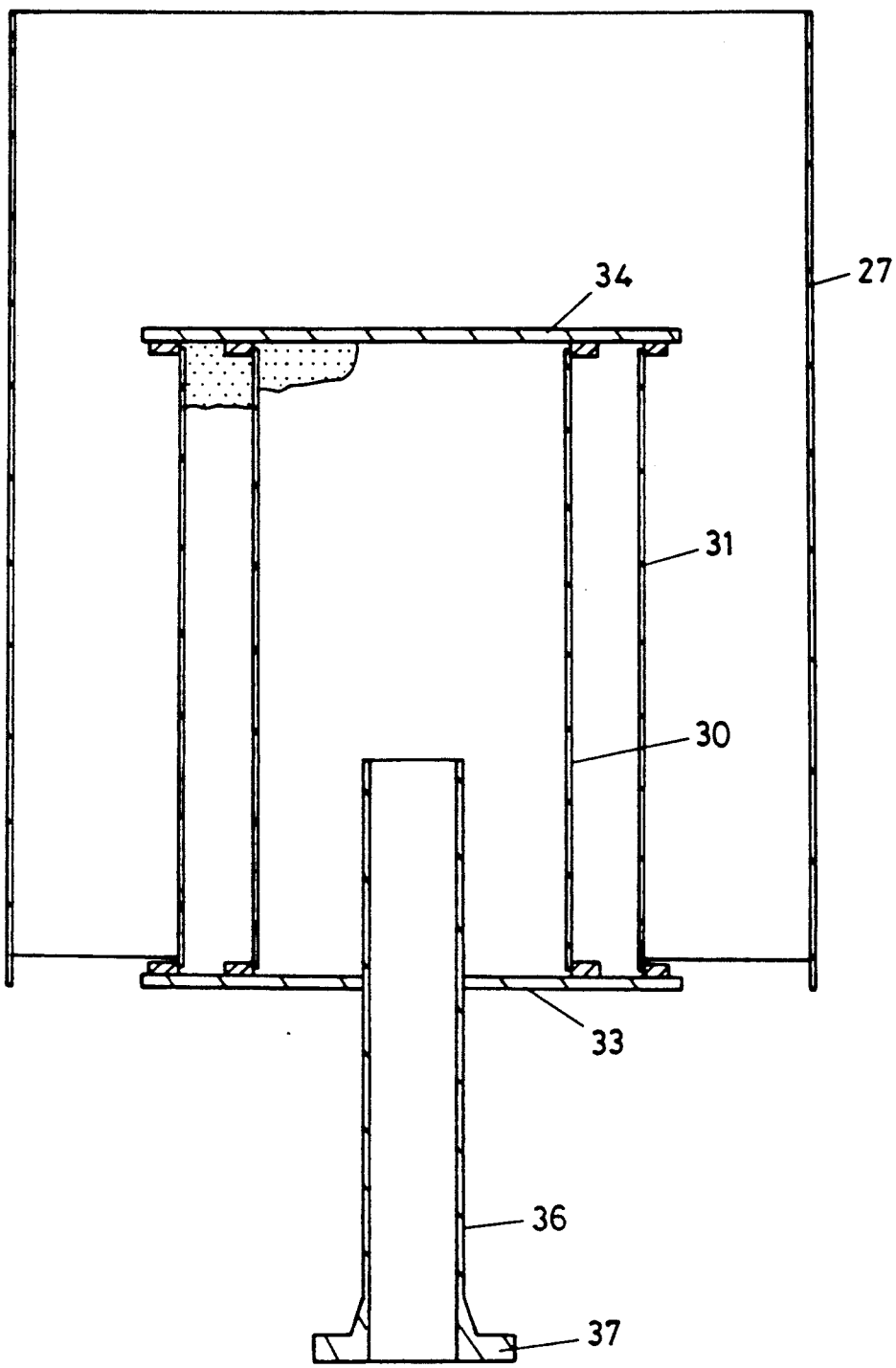

In order to further explain the present invention, several embodiments are described hereunder in some further detail with reference to the accompanying drawings in which:

FIG. 1 is a vertically sectioned view of an attenuated unit according to a first embodiment, FIG. 2 is an horizontally sectioned view along the lines 2—2 in FIG. 1, and FIG. 3 is a vertically sectioned view of an attenuator unit according to a second embodiment.

In both embodiments, gas is vented into the attenuator and passes successively through perforations in the inner cylinder and through each surrounding cylinder in turn, finally escaping to atmosphere or to further pipework via the outer casing, the pressure of the gas being successively reduced as it passes through the stages.

Specifically referring to FIG. 1, there is shown a four stage attenuator unit 10 comprising an inlet attachment flange 11 secured to the outer end of an inlet pipe 12 which projects through a base plate 13 into the attenuator unit. A first stage diffuser 15 is connected to the base plate 13 by weld means 14, the first stage diffuser 15 being provided with an end cap 16. The unit 10 is further provided with second, third, and fourth stage diffusers 18, 19, 20, each of which is provided with radially outturned circular flanges 21 which are secured by securing bolts (not shown) to the base plate 13. Each of the stage diffusers 18, 19, 20 is provided with an end cap 22 which in this embodiment is dome shaped.

The cylindrical outer casing 23 surrounds each of the stage diffusers 15, 18, 19, 20 and is provided with an annular base plate 24 which is secured by securing bolts with respect to the base plate 13. The upper end of the outer casing 23 is open so as to define a discharge opening 24 to allow the gas to escape to atmosphere.

Each of the side walls of the cylindrical elements 18, 19, 20 is perforated with the total free area of perforations in each of the elements increasing in successive stages. As shown in FIG. 1, the elements 18, 19, 20 are co-axially aligned, one within the other, with the height of the elements increasing from the inner to the outer stage.

Referring to the embodiment of FIG. 3, there is shown a three stage attenuator unit 26 comprising a cylindrical outer casing 27 which houses two perforate cylindrical elements 30, 31 (diffuser stages) which are co-axial with the casing 27. The cylinder elements 30, 31 have their lower and upper ends attached to circular base and top plates 33, 34 respectively by securing bolts. As was described in the first embodiment, the unit 26 comprises a gas inlet pipe 36 which is provided with a circular radially projecting inlet flange 37 adapted to be secured to a flange on an existing pipeline.

The number of stages, namely perforate cylindrical elements, is dependent on the range of pressures over which the attenuator is required to be effective. A mentioned, FIG. 1 shows an arrangement of a four stage unit while FIG. 3 shows an arrangement of a three stage unit.

The holes formed in the perforate cylindrical elements are preferably circular and preferably are uniformly distributed over the surface of the cylinder wall. In some cases, the size and spacing of the holes progressively decrease from the inner to the outer stages. The size, number and density of the holes required to give effect to the present invention can be readily determined by a person skilled in the art, and are determined by the physical characteristics of the gas, the total absolute pressure in the immediately upstream stage and the designed maximum mass flow of gas through the device.

The open or free area of perforation of any one stage is designed to achieve the minimum pressure ratio across that stage to ensure sonic choked flow through the perforations.

At the designed maximum flow, all the stages are in a state of choked flow. As the mass flow reduces, the stages become progressively unchoked from the outer stage inwards.

The diameter of the inlet pipe 2 is normally selected to be the same as the discharge tube of the equipment to be vented. If the attenuator is connected to piping on the discharge side, the diameter of the pipe must be larger than the inlet to allow for gas expansion.

In a further non-illustrated embodiment of the invention, the diffusion members comprise a plurality of circular plates which are co-axially aligned and spaced apart in the direction of gas flow, the diameter of the plates progressively increasing from the inner to the outer stage. The diameter of the housing similarly increases in steps from the inner to the outer stage.

A brief consideration of the abovedescribed embodiments will indicate that the invention provides for a vastly improved gas blow-off attenuator which is of simple design, of low cost and is able to reduce blow-off noise to safe levels without reducing the mass flow of fluid through the blow-off system.

I claim:

1. A noise attenuator for use in blowoff vents in air, gas or vapor systems, comprising:
    a housing,
    two or more spaced apart at least partly perforate diffusion members within the housing and through which gas is required to pass in succession,
    gas inlet means for passing the gas along a flow path into the interior of the housing so as to pass through said diffusion members, said inlet means being adapted for attachment to a fluid line to be vented, and
    a discharge outlet in the housing,
    wherein the total free area of perforations in each member increases in successive stages, said perforation in each stage being of a quantity and size to ensure that sonic fluid velocity occurs through at least one of the stages at any mass flow within a predetermined range from a low value up to the maximum mass flow through the unit, and
    wherein the perforations by size and quantity provide the pressure ratio across the final perforate member, through which sonic fluid velocity occurs, near but above the minimum pressure ratio necessary to cause sonic fluid velocity through the perforations of that final member.

2. A noise attenuator according to claim 1 wherein each of said perforate diffusion members includes a perforate circular plate, the diameter of which increases progressively from the inner to the outer stages.

3. A noise attenuator according to claim 1, wherein each said perforate diffusion member is of cylindrical form, the cylindrical members being co-axially aligned and located one inside the other, the diameter and height of the cylinders progressively increasing in the direction of gas flow.

4. A noise attenuator according to claim 3, wherein said cylindrical perforate diffusion members have closed upper and lower ends.

5. A noise attenuator according to claim 1, wherein the number of stages is selected to provide a discharge pressure ratio across one or more of the perforate diffusion members within prescribed limits over the designed flow range and at the pressure of the fluid system at the entry to the attenuator.

6. A noise attenuator according to claim 1, wherein the diameter of the holes in the perforate diffusion members is such as to cause an upward frequency shift in the noise generated by fluid flow within the attenuator.

7. A noise attenuator according to claim 1, wherein the housing is cylindrical, an end of said housing being open to define said discharge outlet.

8. A noise attenuator for use in blow-off vents in air, gas or vapor systems, comprising a housing, two or more spaced apart at least partly perforate diffusion members within the housing and through which gas is required to pass in succession, gas inlet means for passing the gas along a flow path into the interior of the housing so as to pass through said diffusion members, said inlet means being adapted for attachment to a fluid line to be vented, and a discharge outlet in the housing which may be vented to atmosphere or to a further noise attenuator, the improvements wherein the total free area of perforation in each diffusion member increases in successive stages to ensure that sonic fluid velocity occurs through one of the stages at any mass flow within a predetermined range from a low value up to a maximum mass flow through the unit, and wherein the pressure ratio across the outermost or final perforate diffusion member through which sonic fluid velocity occurs is near but above the minimum pressure ratio necessary to cause sonic fluid velocity through the perforations of said outermost or final member, each of said two or more perforate diffusion members being of cylindrical form, the cylindrical members being co-axially aligned and located one inside the other, the diameter and height of the cylinders progressively increasing in the direction of gas flow.

9. A noise attenuator according to claim 8 wherein the number of stages is selected to provide a discharge pressure ratio across one or more of the perforate diffusion members within prescribed limits over the designed flow range and at the pressure of the fluid system at said inlet means to the attenuator.

10. A noise attenuator according to claim 8 wherein the diameter of the holes in the perforate diffusion members is such as to cause an upward frequency shift in the noise generated by fluid flow within the attenuator.

11. A noise attenuator according to claim 8 wherein the housing is cylindrical, an end of said housing being open to define said discharge outlet.

12. A noise attenuator according to claim 8 wherein said cylindrical diffusion members have closed ends.

* * * * *